US012332605B2

(12) United States Patent
Hiraya et al.

(10) Patent No.: US 12,332,605 B2
(45) Date of Patent: Jun. 17, 2025

(54) ELECTRONICALLY CONTROLLED MECHANICAL TIMEPIECE

(71) Applicant: SEIKO EPSON CORPORATION, Tokyo (JP)

(72) Inventors: Eiichi Hiraya, Shiojiri (JP); Eiichi Nagasaka, Minowa (JP)

(73) Assignee: SEIKO EPSON CORPORATION (JP)

( * ) Notice: Subject to any disclaimer, the term of this patent is extended or adjusted under 35 U.S.C. 154(b) by 455 days.

(21) Appl. No.: 17/868,869

(22) Filed: Jul. 20, 2022

(65) Prior Publication Data

US 2023/0024159 A1 Jan. 26, 2023

(30) Foreign Application Priority Data

Jul. 21, 2021 (JP) ................................ 2021-120651

(51) Int. Cl.

*G04C 10/00* (2006.01)
*G04B 1/10* (2006.01)
*G04B 13/02* (2006.01)

(52) U.S. Cl.

CPC ............... *G04C 10/00* (2013.01); *G04B 1/10* (2013.01); *G04B 13/02* (2013.01)

(58) Field of Classification Search

CPC ........ G04C 10/00; G04C 3/101; G04C 10/04; G04B 1/10; G04B 13/02; G04B 1/12; G04B 1/16; G04B 27/04; G04B 3/04; G04B 9/005; G04B 19/247

See application file for complete search history.

(56) References Cited

U.S. PATENT DOCUMENTS

| | | | | |
|---|---|---|---|---|
| 6,097,675 | A * | 8/2000 | Takahashi .............. | G04C 10/00 310/75 A |
| 6,373,788 | B1 * | 4/2002 | Moteki .................. | G04C 3/008 368/203 |
| 6,973,010 | B1 * | 12/2005 | Koike .................... | G04C 10/00 368/204 |

FOREIGN PATENT DOCUMENTS

| | | | |
|---|---|---|---|
| JP | H11-281760 | A | 10/1999 |
| JP | 2001-145309 | A | 5/2001 |
| JP | 2003-066167 | A | 3/2003 |

* cited by examiner

*Primary Examiner* — Edwin A. Leon

(74) *Attorney, Agent, or Firm* — Harness, Dickey & Pierce, P.L.C.

(57) ABSTRACT

An electronically controlled mechanical timepiece includes: a rotor including a rotary shaft, a pinion that is provided on the rotary shaft and to which torque from a mainspring is transmitted, and a rotor magnet attached to the rotary shaft, the rotor being configured to rotate by the torque; a generator that includes a coil and a stator and that is configured to generate power by rotation of the rotor; a main plate that contains a magnetic material, that has an opposing surface opposed to the stator, and that is configured to support the rotary shaft of the rotor; wherein in a cross-sectional view viewed from a direction perpendicular to an axial direction of the rotary shaft, a center of the stator along the axial direction is disposed farther toward the opposing surface side than a center of the rotor magnet along the axial direction.

7 Claims, 6 Drawing Sheets

ELECTRONICALLY CONTROLLED MECHANICAL TIMEPIECE

The present application is based on, and claims priority from JP Application Serial Number 2021-120651, filed Jul. 21, 2021, the disclosure of which is hereby incorporated by reference herein in its entirety.

BACKGROUND

1. Technical Field

The present disclosure relates to an electronically controlled mechanical timepiece.

2. Related Art

JP-A-11-281760 discloses an electronically controlled mechanical timepiece that converts the mechanical energy output when a mainspring is released into electrical energy in a generator, causes a rotation control means to operate by that electrical energy, and control the rotation of a rotor to precisely move a hand fixed to a train wheel.

In JP-A-11-281760, a portion formed of a magnetic material of a main plate is disposed away from a rotor magnet of the rotor, thereby making it possible to decrease leakage magnetic flux leaking from the rotor magnet to the magnetic material portion of the main plate and suppress eddy current loss in the main plate.

As described in JP-A-11-281760, when part of the magnetic flux generated by the rotor magnet becomes leakage magnetic flux and interlinks with the magnetic material portion of the main plate, eddy current loss occurs in the main plate, increasing the torque required to rotate the rotor. Thus, the energy of the mainspring is consumed and the duration is shortened. Accordingly, there is a demand for further reducing the effect of the main plate formed using a magnetic material.

SUMMARY

An electronically controlled mechanical timepiece of the present disclosure includes: a rotor including a rotary shaft, a pinion that is provided on the rotary shaft and to which torque from a mainspring is transmitted, and a rotor magnet attached to the rotary shaft, the rotor being configured to rotate by the torque, a generator that includes a coil and a stator and that is configured to generate power by rotation of the rotor, a main plate that contains a magnetic material, that has an opposing surface opposed to the stator, and that is configured to support the rotary shaft of the rotor, wherein in a cross-sectional view viewed from a direction perpendicular to an axial direction of the rotary shaft, a center of the stator along the axial direction is disposed farther toward the opposing surface side than a center of the rotor magnet along the axial direction.

An electronically controlled mechanical timepiece of the present disclosure includes: a dial having a front surface and a back surface, a main plate that is disposed on the back surface side of the dial and that contains a magnetic material, a rotor including a rotary shaft having a tenon on both ends, a pinion that is provided on the rotary shaft and to which torque from a mainspring is transmitted, and a rotor magnet attached to the rotary shaft, the rotor being disposed on an opposite side of the main plate from the dial and being configured to rotate by the torque, a bearing including a frame body that is fixed to the main plate and that is formed using a nonmagnetic material, a hole jewel that is fixed to the frame body and into which one tenon of the rotary shaft is inserted, a cap jewel disposed inside the frame body, and a hold spring configured to hold the cap jewel, the bearing being configured to journal the one tenon, wherein in a cross-sectional view viewed from a direction perpendicular to an axial direction of the rotary shaft, the frame body is fixed to the main plate at a position farther toward the dial side than the hole jewel relative to the rotor magnet.

DESCRIPTION OF EXEMPLARY EMBODIMENTS

First Embodiment

Hereinafter, an electronically controlled mechanical timepiece 1 according to a first embodiment of the present disclosure will be described with reference to the drawings. Note that in the description of the present embodiment, a plan view means a state viewed from the axial direction of a rotary shaft 82 of a rotor 81 to be described later. Furthermore, a cross-sectional view means a state viewed from a direction perpendicular to the axial direction of the rotary shaft 82 of the rotor 81 to be described later.

Figure 1:
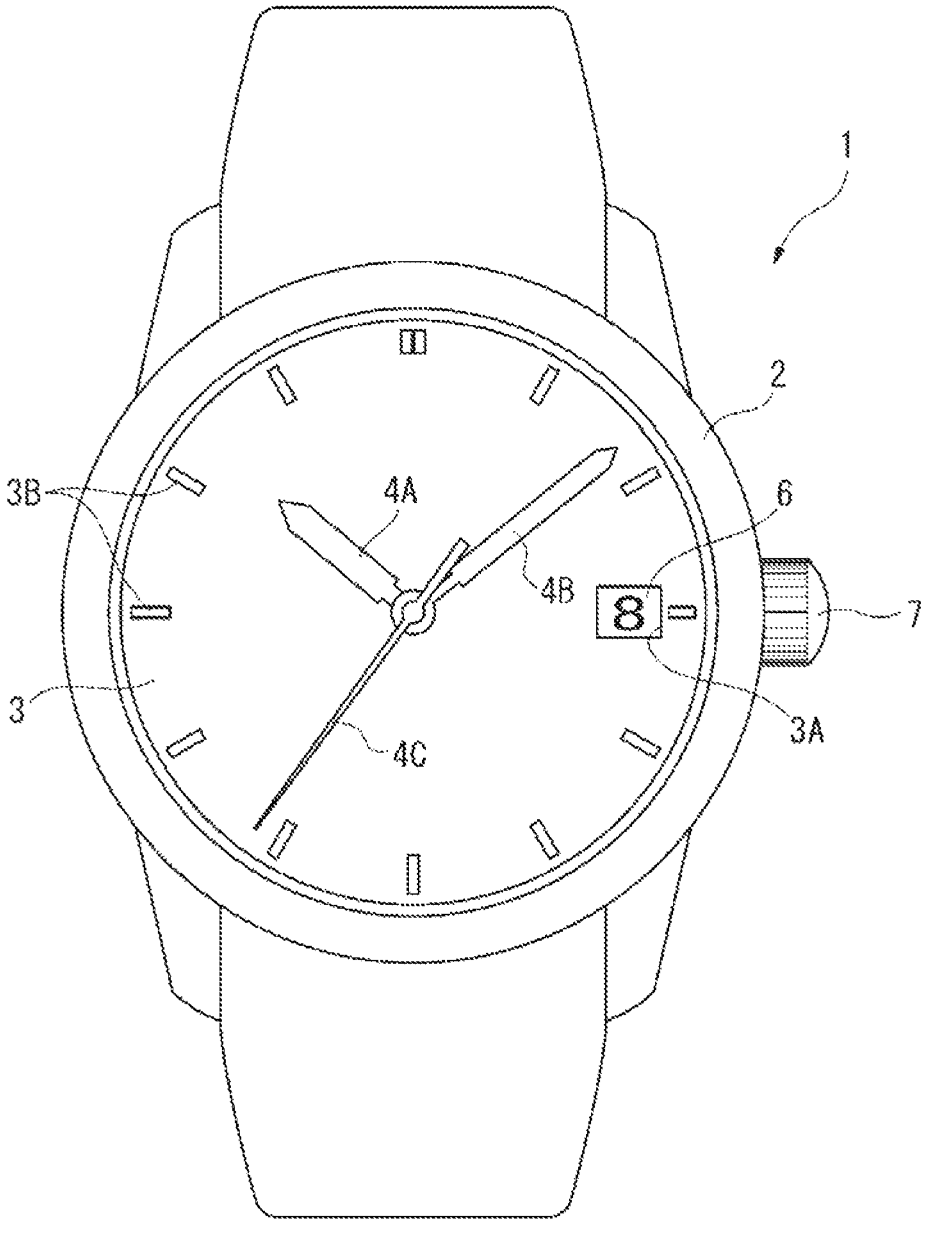
FIG. 1 is a front view illustrating an electronically controlled mechanical timepiece according to a first embodiment.

FIG. 1 is a front view illustrating the electronically controlled mechanical timepiece 1. The electronically controlled mechanical timepiece 1 is a watch to be worn on a wrist of a user. The electronically controlled mechanical timepiece 1 includes a cylindrical outer case 2. A dial 3 is disposed on an inner peripheral side of the outer case 2.

Figure 2:
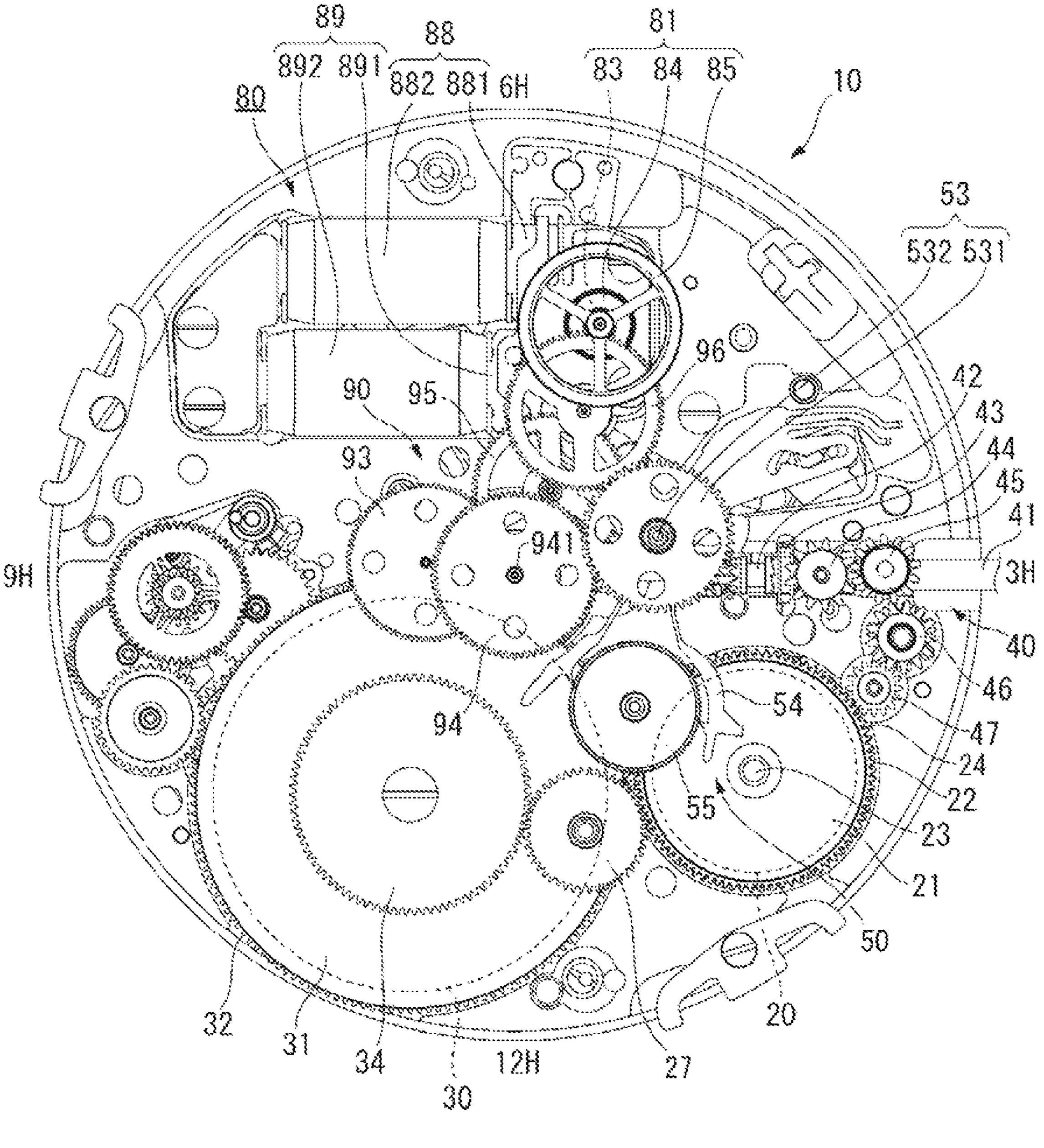
FIG. 2 is a plan view illustrating main parts of a movement of the first embodiment.
Figure 3:
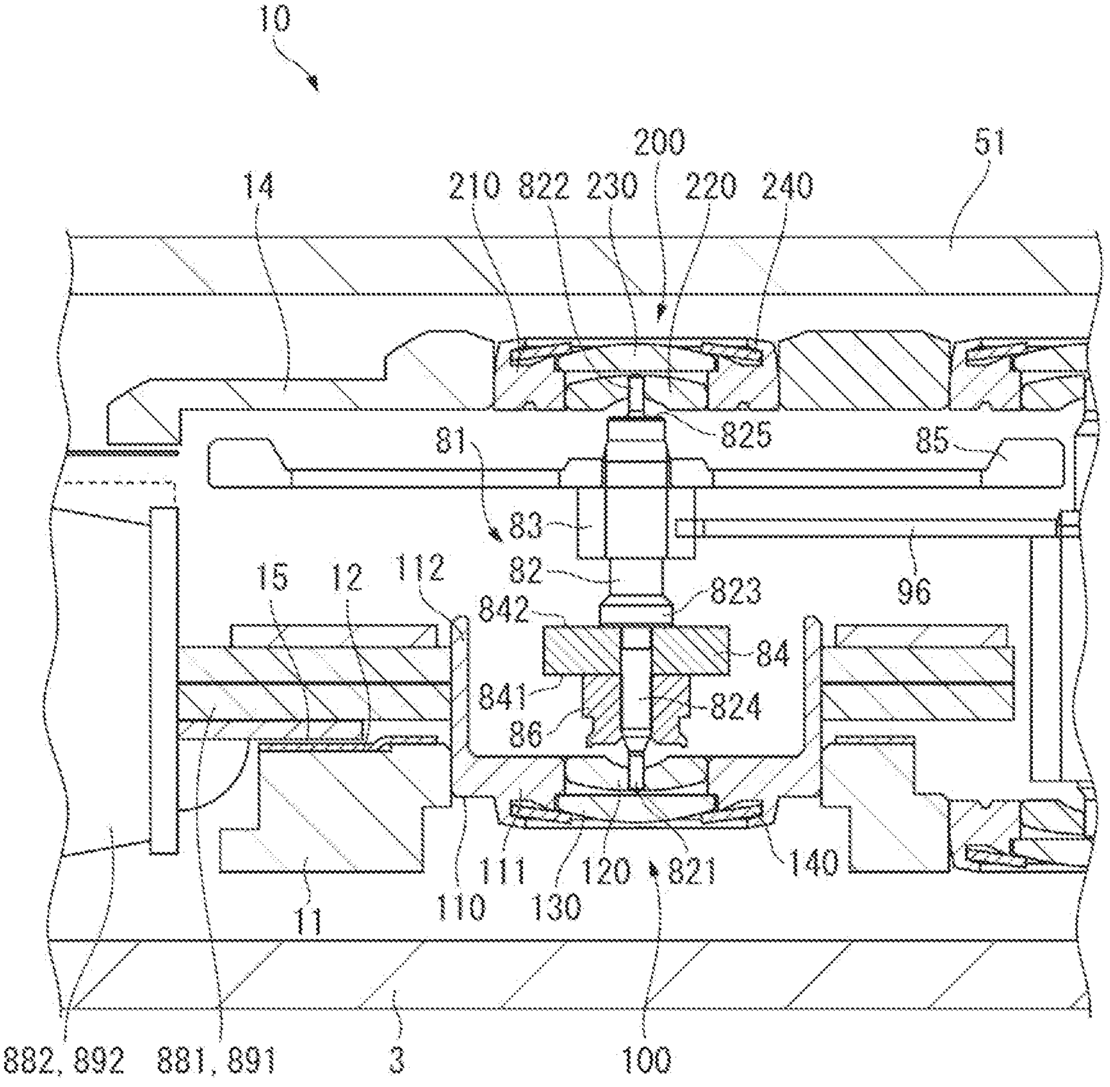
FIG. 3 is a cross-sectional view illustrating main parts of the movement of the first embodiment.

The electronically controlled mechanical timepiece 1 includes a movement 10 illustrated in FIGS. 2 and 3 stored in the outer case 2, and an hour hand 4A, a minute hand 4B, and a seconds hand 4C for indicating time information illustrated in FIG. 1.

A calendar small window 3A is provided in the dial 3. A date indicator 6 is visually recognizable from the calendar small window 3A. The dial 3 is a plate-shaped member having a front surface and a back surface. The front surface is a surface that is visually recognized from the user. Furthermore, hour marks 3B for indicating time are displayed on the front surface side of the dial 3.

A crown 7 is provided on a side surface of the outer case 2. From a zero stage position, which is obtained when the crown 7 is pressed toward the center of the electronically controlled mechanical timepiece 1, the crown 7 can be pulled out and moved to a first stage position and a second stage position.

Rotating the crown 7 in the zero stage position can wind a first mainspring 20 and a second mainspring 30 provided in the movement 10. The electronically controlled mechanical timepiece 1 can ensure a duration of approximately 120 hours when the first mainspring and the second mainspring are fully wound up. Rotating the crown 7 with the crown 7 pulled to the first stage position can move the date indicator 6 to adjust the date. Pulling the crown 7 to the second stage position stops the seconds hand 4C. Rotating the crown 7 in the second stage position can move the hour hand 4A and the minute hand 4B to adjust the time. The methods for correcting the date indicator 6, the hour hand 4A, and the minute hand 4B by the crown 7 are similar to those of conventional mechanical timepieces, so description thereof is omitted.

Movement

FIG. 2 is a plan view illustrating main parts of the movement 10 of the first embodiment. FIG. 3 is a cross-sectional view illustrating main parts of the movement 10.

As illustrated in FIGS. 2 and 3, the movement 10 includes a first barrel complete 21 in which the first mainspring 20 is housed, and a second barrel complete 31 in which the second mainspring 30 is housed. The hour hand 4A, the minute hand 4B, and the seconds hand 4C are driven by the first mainspring 20 and the second mainspring 30 of the movement 10. Note that the first mainspring 20 and the second mainspring 30 are examples of mainsprings of the present disclosure.

The movement 10 includes a main plate 11 disposed on a back surface side of the dial 3, and a train wheel bridge 14. In addition, between the main plate 11 and the train wheel bridge 14, there are disposed the first barrel complete 21, the second barrel complete 31, and a manual winding mechanism 40 and an automatic winding mechanism 50 that wind up the first mainspring 20 and the second mainspring 30. Between the main plate 11 and the train wheel bridge 14, there are also disposed an indicator train wheel 90 that transmits the torque of the first mainspring 20 and the second mainspring 30, and a generator 80 driven by the torque transmitted via the indicator train wheel 90.

Here, in the present embodiment, the main plate 11 is formed by applying surface treatment by a magnetic material such as nickel plating to a surface of a substrate formed using a non-magnetic material such as brass and synthetic resin, for example, to prevent rust and improve appearance. That is, in the present embodiment, the main plate 11 is formed to contain a magnetic material.

Furthermore, in the present embodiment, the main plate 11 has an opposing surface 12 opposed to stators 881 and 891 to be described later. Further, a circuit insulating plate 15 is disposed on the stators 881 and 891 side of the opposing surface 12 of the main plate 11.

Note that the main plate 11 is not limited to the configuration described above. For example, the substrate may be formed using a magnetic material.

First Mainspring and First Barrel Complete

The first mainspring 20 is housed in the first barrel complete 21. The first barrel complete 21 includes a first barrel 22 and a first barrel core 23. A first ratchet wheel 24 that rotates integrally with the first barrel core 23 is attached to the first barrel core 23.

Manual Winding Mechanism

The manual winding mechanism 40 includes a winding stem 41 to which the crown 7 is attached, a clutch wheel 42, a winding pinion 43, a crown wheel 44, a ratchet first reduction wheel 45, a ratchet second reduction wheel and pinion 46, and a ratchet third reduction wheel and pinion 47. The ratchet third reduction wheel and pinion 47 is engaged with the first ratchet wheel 24.

For this reason, when the user rotates the crown 7 in the zero stage position, the winding stem 41 and the clutch wheel 42 rotate. When the crown 7 is in the zero stage position, the clutch wheel 42 is engaged with the winding pinion 43, and the rotation of the clutch wheel 42 is sequentially transmitted from the winding pinion 43 to the crown wheel 44, the ratchet first reduction wheel 45, the ratchet second reduction wheel and pinion 46, and the ratchet third reduction wheel and pinion 47. For this reason, the first ratchet wheel 24 and the first barrel core 23 rotate, and the first mainspring is wound up.

Automatic Winding Mechanism

The automatic winding mechanism 50 includes an oscillating weight 51, an eccentric wheel 53, a pawl lever 54, and a transmission wheel 55.

The eccentric wheel 53 includes an eccentric gear 531 and an eccentric shaft member 532. The eccentric wheel 53 rotationally moves in both forward and backward directions in an interlocking manner with the oscillating weight 51.

The pawl lever 54 is attached to the eccentric shaft portion of the eccentric shaft member 532 of the eccentric wheel 53 so as to be capable of moving rotationally.

When the eccentric wheel 53 rotationally moves in an interlocking manner with the oscillating weight 51, the pawl lever 54 attached to the eccentric wheel 53 moves back and forth in a direction approaching to the transmission wheel 55 and in a direction separating therefrom, thereby rotating the transmission wheel 55 in one direction.

The transmission wheel 55 includes a gear engaged with the first ratchet wheel 24. When rotating in one direction in an interlocking manner with the back-and-forth movement of the pawl lever 54, the transmission wheel 55 rotates the first ratchet wheel 24. Rotation of the first ratchet wheel 24 causes the first barrel core 23 to rotate integrally with the first ratchet wheel 24, causing the first mainspring 20 to be wound up.

Therefore, in the electronically controlled mechanical timepiece 1 of the present embodiment, the first mainspring 20 can be wound up by both manual winding realized by manipulating the crown 7 and automatic winding realized by causing the oscillating weight 51 to move rotationally.

Second Mainspring and Second Barrel Complete

The second mainspring 30 is housed in the second barrel complete 31. The second barrel complete 31 includes a second barrel 32.

The second mainspring 30 is wound up by the first mainspring 20. That is, when the first mainspring 20 has been wound up and the torque capable of winding up the second mainspring 30 has been accumulated, the first barrel 22 of the first barrel complete 21 rotates. The first barrel 22 is engaged with a second ratchet wheel 34 via an intermediate barrel complete 27. Rotation of the first barrel 22 rotates the second ratchet wheel 34 and a second barrel core, causing the second mainspring to be wound up.

Therefore, in the electronically controlled mechanical timepiece 1 of the present embodiment, the first mainspring 20 and the second mainspring 30 can be wound up by any of the manual winding mechanism 40 and the automatic winding mechanism 50. Note that for the electronically controlled mechanical timepiece 1, only one of the manual winding mechanism 40 and the automatic winding mechanism 50 may be provided.

Generator

The generator 80 includes the rotor 81 and coil blocks 88 and 89.

The coil block 88 is formed by winding a coil 882 around a stator 881. The coil block 89 is formed by winding a coil 892 around a stator 891.

Furthermore, as described previously, the stators 881 and 891 are disposed opposed to the opposing surface 12 of the main plate 11.

In the present embodiment, rotation of the rotor 81 by external torque causes the generator 80 to generate induced power by the coil blocks 88 and 89, and output and supply electrical energy to a capacitor or the like. Furthermore, shorten-circuiting the coils 882 and 892 can apply a brake to the rotor 81, and controlling the braking force can regulate the rotation period of the rotor 81 to be constant.

In this manner, the electronically controlled mechanical timepiece 1 of the present embodiment includes the generator 80 that generates induced power and outputs electrical energy.

The rotor 81 includes a rotary shaft 82, a rotor pinion 83, a rotor magnet 84, a rotor inertial plate 85, and a stopper 86. The rotor magnet 84, the rotor inertial plate 85, and the stopper 86 are each attached to the rotary shaft 82. The rotor inertial plate 85 is a component for reducing fluctuation in rotational speed of the rotor 81 relative to fluctuation in drive torque from the second barrel 32.

A first tenon 821 is formed at the end portion on the main plate 11 side of the rotary shaft 82. A second tenon 822 is formed at the end portion on the train wheel bridge 14 side of the rotary shaft 82. In the rotary shaft 82, the rotor pinion 83 through which torque from the mainspring is transmitted is integrally formed. Furthermore, the rotary shaft 82 includes a large-diameter flange 823 and a small-diameter shaft portion 824 formed continuously with the flange 823, with the first tenon 821 being provided at the tip of the shaft portion 824. Note that the tip of the shaft portion 824 is formed in a tapered shape with a gradually decreasing diameter, and is continuous with the first tenon 821. The continuous portion of the first tenon 821 and the shaft portion 824 is a curved surface. Thus, even when force in the radial direction is applied to the rotor 81, the first tenon 821 can be prevented from breaking at its base.

An end surface 825 on the train wheel bridge 14 side of the rotary shaft 82 is larger in diameter than the second tenon 822. Furthermore, the base portion of the second tenon 822 that is continuous with the end surface 825 is a curved surface. Thus, even when force in the radial direction is applied to the rotor 81, the second tenon 822 can be prevented from breaking at its base.

The rotor magnet 84 is formed in a cylindrical shape, in which the surface on the main plate 11 side is referred to as the first surface 841, and the surface on the train wheel bridge 14 side is referred to as the second surface 842. In addition, the shaft portion 824 is inserted into the rotor magnet 84, and the second surface 842 abuts on the flange 823.

The stopper 86 is formed in a substantially cylindrical shape, and is press-fitted to the shaft portion 824. This causes the rotor magnet 84 to be fixed by being sandwiched between the flange 823 and the stopper 86. Therefore, the stopper 86 also serves as a magnet fixing spacer that fixes the rotor magnet 84.

Indicator Train Wheel

Next, the indicator train wheel 90 that drives the hour hand 4A, the minute hand 4B, and the seconds hand 4C by the mechanical energy from the first mainspring 20 and the second mainspring 30 will be described.

The indicator train wheel 90 includes a center wheel and pinion (not illustrated), a third wheel and pinion 93, a fourth wheel and pinion 94, a fifth wheel and pinion 95, and a sixth wheel and pinion 96. Rotation of the second barrel 32 is transmitted to the center wheel and pinion, and is then sequentially accelerated at the third wheel and pinion 93, the fourth wheel and pinion 94, the fifth wheel and pinion 95, and the sixth wheel and pinion 96 before being transmitted to the rotor 81. Therefore, the rotor 81 rotates by the torque transmitted from the first mainspring 20 and the second mainspring 30.

In the center wheel and pinion, the minute hand 4B is fixed via a cannon pinion (not illustrated). In the fourth wheel and pinion 94, the seconds hand 4C is fixed via a seconds hand shaft 941. Furthermore, an hour wheel (not illustrated) is coupled to the cannon pinion, and the hour hand 4A is fixed to the hour wheel.

In the electronically controlled mechanical timepiece 1 above, the alternating current output from the generator 80 is boosted and rectified through a rectifier circuit including boost rectification, full-wave rectification, half-wave rectification, transistor rectification, and the like, and is charged to a smoothing capacitor. The electric power from this capacitor causes a rotation control device (not illustrated) that controls the rotation period of the generator 80 to operate. Note that the rotation control device is constituted by an integrated circuit including an oscillating circuit, a divider circuit, a rotation detection circuit, a rotational speed comparison circuit, an electromagnetic brake control means, and the like. A crystal oscillator is used for the oscillating circuit.

Bearing of Rotor

The bearing that journals the rotor 81 includes a first bearing 100 attached to the main plate 11 and a second bearing 200 attached to the train wheel bridge 14. Note that the rotary shaft 82 of the rotor 81 is supported by the main plate 11 and the train wheel bridge 14 via the first bearing 100 and the second bearing 200.

First Bearing

The first bearing 100 includes a frame body 110 fixed to the main plate 11, a hole jewel 120 fixed to the frame body 110, a cap jewel 130 disposed in the frame body 110, and a hold spring 140 that holds the cap jewel 130.

The frame body 110 is formed using a non-magnetic material such as a non-magnetic metal or synthetic resin. The frame body 110 includes a disk-shaped holding portion 111 and a ring-shaped positioning portion 112 that is continuous with the outer periphery of the holding portion 111.

The hole jewel 120 is formed of a ruby or the like, for example. The first tenon 821 of the rotary shaft 82 is inserted into the center of the hole jewel 120. The hole jewel 120 is press-fitted and fixed to the frame body 110, and rotatably journals the first tenon 821 of the rotary shaft 82.

The cap jewel 130 is a substantially disk-shaped component formed of ruby or the like, for example. The cap jewel 130 is disposed in the holding portion 111 of the frame body 110.

The hold spring 140 is constituted by a leaf spring member formed of a metal, for example. With the outer peripheral end portion being held by the holding portion 111 of the frame body 110, the hold spring 140 biases the cap jewel 130 to the rotary shaft 82 side.

Second Bearing

The second bearing 200 includes a frame body 210, a hole jewel 220, a cap jewel 230, and a hold spring 240.

The frame body 210 has a configuration similar to that of the holding portion 111 of the frame body 110. The frame body 210 is fixed to the train wheel bridge 14.

The hole jewel 220, the cap jewel 230, and the hold spring 240 are the same components as the hole jewel 120, the cap jewel 130, and the hold spring 140, respectively, so description thereof is omitted.

About Disposition of Stator and Rotor Magnet

Next, the disposition of the stators 881 and 891 and the rotor magnet 84 will be described.

Figure 4:
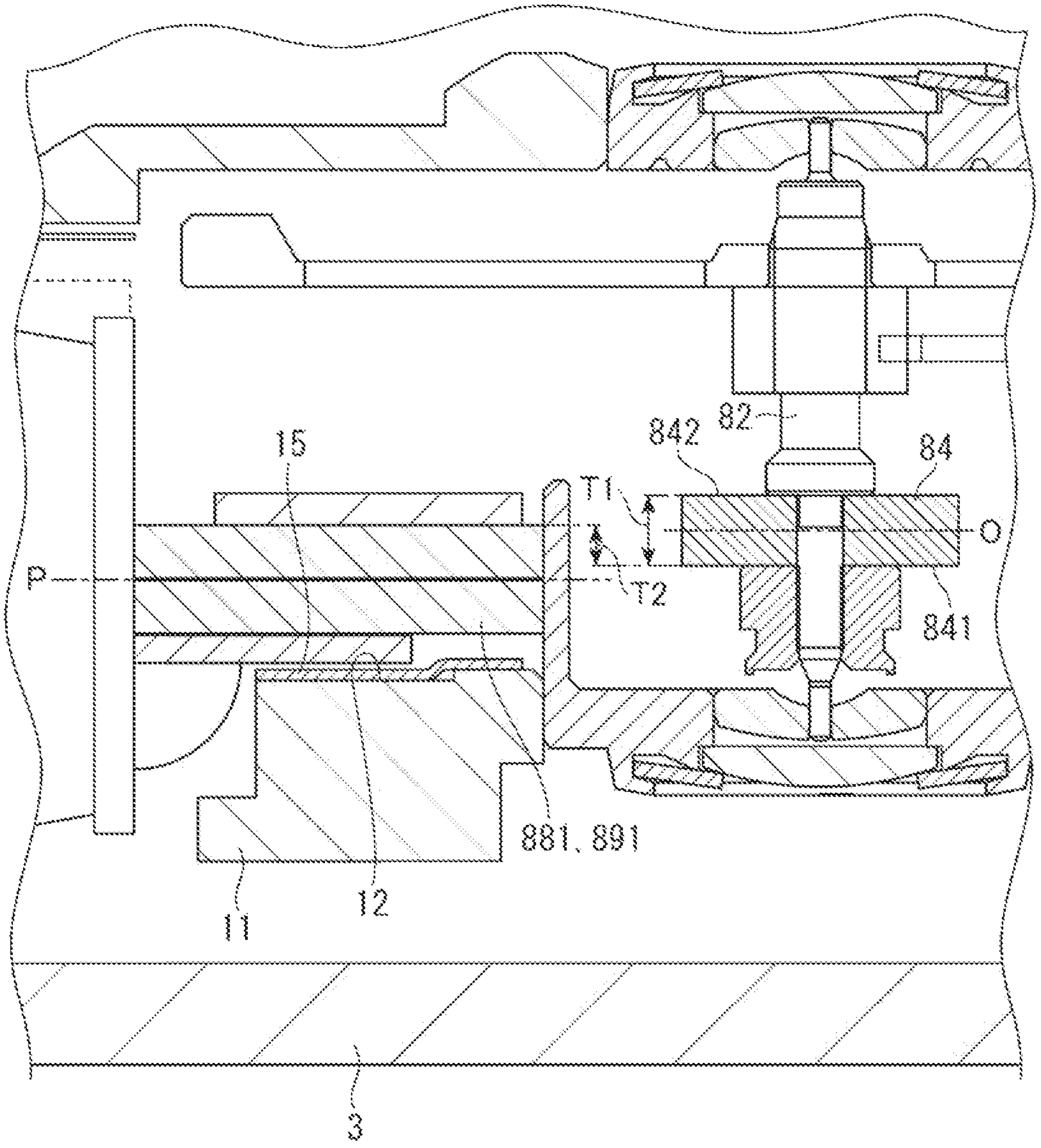
FIG. 4 is an enlarged cross-sectional view illustrating main parts of the movement of the first embodiment.

FIG. 4 is an enlarged cross-sectional view illustrating main parts of the movement 10.

As illustrated in FIG. 4, in the present embodiment, the stators 881 and 891 are disposed such that a center line P extending in a direction perpendicular to the axial direction of the rotary shaft 82 in a cross-sectional view, that is, the center line P passing through the center of the dimension of the stators 881 and 891 along the axial direction of the rotary shaft 82, is located farther toward the opposing surface 12 side of the main plate 11 than a center line O of the rotor magnet 84, that is, the center line O passing through the center of the dimension of the rotor magnet 84 along the axial direction of the rotor magnet 84. That is, in the present embodiment, the rotor magnet 84 is disposed such that the center line O extending in a direction perpendicular to the rotary shaft 82 is located farther toward the train wheel bridge 14 side than the center line P of the stators 881 and 891.

This makes it possible, in a cross-sectional view, to dispose the main plate 11 and the rotor magnet 84 away from each other in the present embodiment, compared to a case in which the rotor magnet 84 is disposed such that the center line O of the rotor magnet 84 coincides with the center line P of the stators 881 and 891. Accordingly, leakage magnetic flux that leaks from the rotor magnet 84 to the magnetic material portion of the main plate 11 can be decreased, and eddy current loss in the main plate 11 can be suppressed.

Here, in the present embodiment, the rotor magnet 84 is disposed so as to partially overlap the stators 881 and 891 in the height direction, that is, in the axial direction of the rotary shaft 82. That is, in a cross-sectional view, the rotor magnet 84 and the stators 881 and 891 are disposed at such positions as to at least partially overlap each other. Further, the rotor magnet 84 is disposed such that the first surface 841, which is the surface on the main plate 11 side, is located farther toward the train wheel bridge 14 side than the center line P of the stators 881 and 891. That is, the stators 881 and 891 are disposed such that the center line P is located farther toward the opposing surface 12 side of the main plate 11 than the first surface 841 of the rotor magnet 84. In other words, the stators 881 and 891 and the rotor magnet 84 are disposed such that the dimension from the center line O to the opposing surface 12 along the axial direction of the rotary shaft 82 is greater than the dimension from the center line P to the opposing surface 12 along the axial direction of the rotary shaft 82.

More specifically, in a cross-sectional view, the rotor magnet 84 and the stators 881 and 891 are disposed such that the dimension T2 of a place in which the rotor magnet 84 and the stators 881 and 891 overlap each other in the height direction is not less than 50% of the dimension T1 in the height direction of the rotor magnet 84. That is, the rotor magnet 84 and the stators 881 and 891 overlaps each other by 50% or more of the dimension in the height direction of the rotor magnet 84. In other words, the rotor magnet 84 is disposed such that the center line O of the rotor magnet 84 is located farther toward the main plate 11 side than the surface on the train wheel bridge 14 side of the stators 881 and 891.

Figure 5:
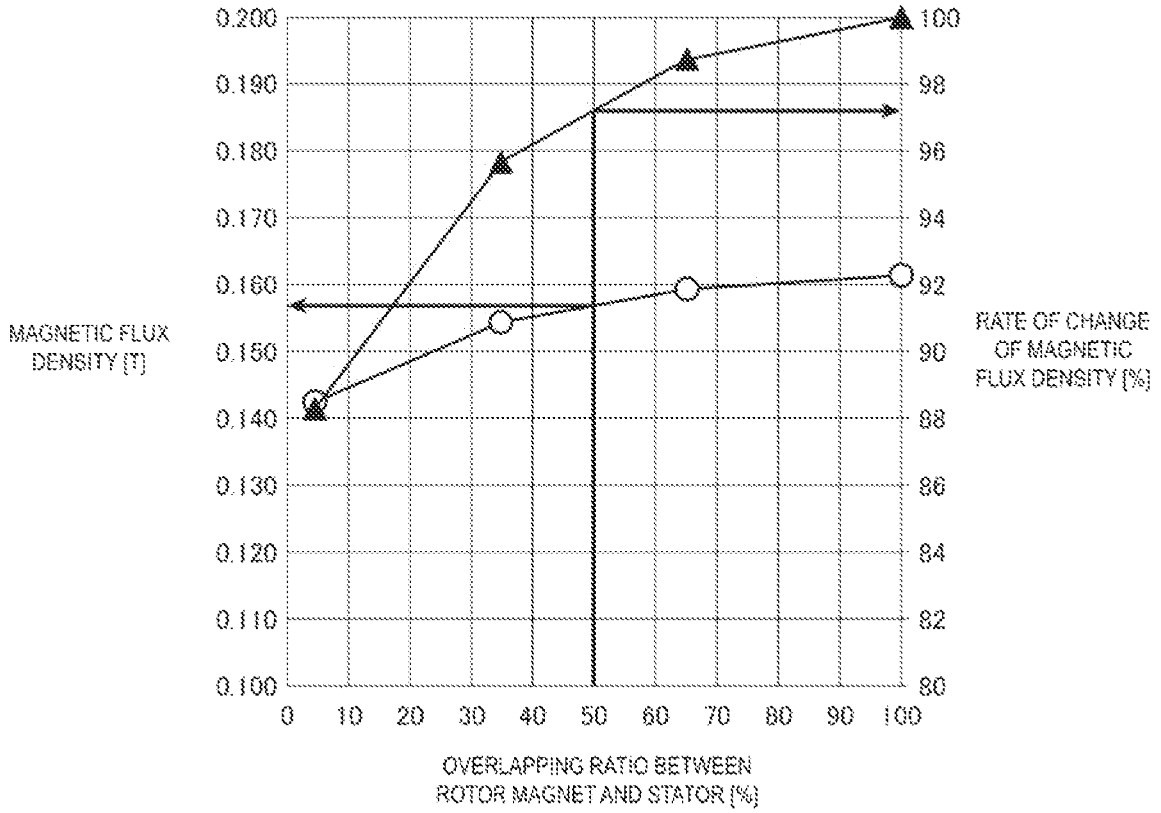
FIG. 5 is a graph showing the relationship between the overlapping ratio between a rotor magnet and a stator and magnetic flux density.

FIG. 5 is a graph showing the relationship between the overlapping ratio between the rotor magnet 84 and the stators 881 and 891 and magnetic flux density at the stators 881 and 891. Note that in FIG. 5, the horizontal axis indicates the overlapping ratio between the rotor magnet 84 and the stators 881 and 891 relative to the dimension in the height direction of the rotor magnet 84; the vertical axis on the left indicates magnetic flux density at the stators 881 and 891; and the vertical axis on the right indicates the ratio of magnetic flux density with the magnetic flux density when the overlapping ratio is 100% being 100. As illustrated in FIG. 5, when the overlapping ratio between the rotor magnet 84 and the stators 881 and 891 is 50%, that is, when the rotor magnet 84 and the stators 881 and 891 are disposed such that T2 in FIG. 4 is half of T1, the magnetic flux density at the stators 881 and 891 is approximately 0.158 tesla. This represents a value of approximately 97% of the magnetic flux density obtained when the overlapping ratio between the rotor magnet 84 and stators 881 and 891 is 100%. That is, it was suggested that if the overlapping ratio between the rotor magnet 84 and the stators 881 and 891 is not less than 50%, the magnetic flux density at the stators 881 and 891 is largely unaffected. Accordingly, in the present embodiment, in a cross-sectional view, even when the rotor magnet 84 is disposed at such a position that a portion of the rotor magnet 84 does not overlap the stators 881 and 891, the rotor magnet 84 and the stators 881 and 891 are disposed so as overlap each other by 50% or more of the dimension in the height direction of the rotor magnet 84. Thus, there is little effect on the magnetic flux density at the stators 881 and 891, and power generation at the generator 80 is largely unaffected.

Note that the present disclosure is not limited to the configuration described above. For example, the rotor magnet 84 and the stators 881 and 891 may be disposed such that, in a cross-sectional view, the dimension T2 of a place in which the rotor magnet 84 and the stators 881 and 891 overlap each other in the height direction is not less than 35% of the dimension T1 in the height direction of the rotor magnet 84. When configured in this manner, a magnetic flux density of approximately 95% of the magnetic flux density obtained when the overlapping ratio between the rotor magnet 84 and the stators 881 and 891 is 100% can be ensured. Thus, there is little effect on the magnetic flux density at the stators 881 and 891, and power generation at the generator 80 is largely unaffected.

Operations and Effects of First Embodiment

According to the present embodiment, the following advantageous effects can be obtained.

In the present embodiment, in a cross-sectional view viewed from a direction perpendicular to the axial direction of the rotary shaft 82 of the rotor 81, the center line P of the stators 881 and 891 is disposed farther toward the opposing surface 12 side of the main plate 11 than the center line O of the rotor magnet 84. Thus, the main plate 11 formed to contain a magnetic material and the rotor magnet 84 can be disposed away from each other. Accordingly, leakage magnetic flux that leaks from the rotor magnet 84 to the magnetic material portion of the main plate 11 can be decreased, and eddy current loss in the main plate 11 can be suppressed. Therefore, the duration of the first mainspring 20 and the second mainspring 30 can be increased.

In the present embodiment, in a cross-sectional view, the rotor magnet 84 and the stators 881 and 891 are disposed at such positions as to at least partially overlap each other, and the center line P of the stators 881 and 891 is disposed farther toward the opposing surface 12 side than the first surface 841, which is the surface on the main plate 11 side of the rotor magnet 84. This makes it possible to dispose the rotor magnet 84 away from the main plate 11 while suppressing the effect on the magnetic flux density at the stators 881 and 891. Further, the stators 881 and 891 can be disposed farther toward the main plate 11 side, and thus the electronically controlled mechanical timepiece 1 can be made thinner.

In the present embodiment, in a cross-sectional view, the rotor magnet 84 and the stators 881 and 891 overlap each other by 35% or more of the dimension in the height direction of the rotor magnet 84. Thus, the rotor magnet 84 can be disposed away from the main plate 11 with the magnetic flux density at the stators 881 and 891 largely unaffected.

In the present embodiment, in a cross-sectional view, the rotor magnet 84 and the stators 881 and 891 overlap each other by 50% or more of the dimension in the height direction of the rotor magnet 84. Thus, the rotor magnet 84 can be disposed away from the main plate 11 without the magnetic flux density at the stators 881 and 891 being further affected.

Second Embodiment

Next, an electronically controlled mechanical timepiece of a second embodiment of the present disclosure will be described with reference to FIG. 6. Note that in the second embodiment, the same configurations as those of the first embodiment or configurations similar to those of the first embodiment will be given the same reference numerals, and description thereof will be omitted or simplified.

Figure 6:
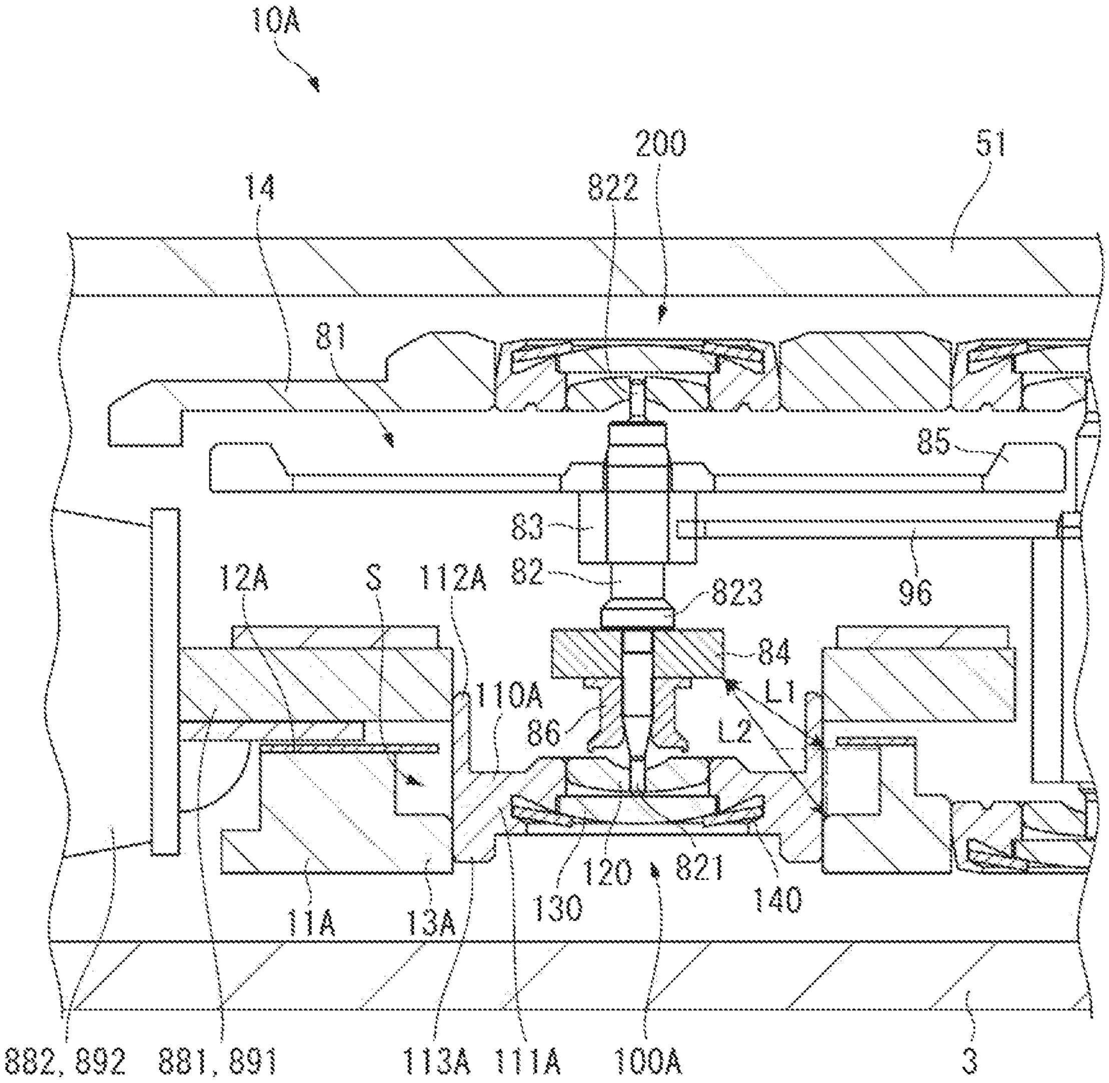
FIG. 6 is a cross-sectional view illustrating main parts of a movement of a second embodiment.

FIG. 6 is a cross-sectional view illustrating main parts of a movement 10A of an electronically controlled mechanical timepiece of the second embodiment.

As illustrated in FIG. 6, similar to the movement 10 of the first embodiment described previously, the movement 10A of the second embodiment includes a main plate 11A disposed on the back surface side of the dial 3, and the train wheel bridge 14.

Further, the movement 10A includes the rotor 81, the stators 881 and 891, the coils 882 and 892, a first bearing 100A, and the second bearing 200.

Note that in the present embodiment, similar to the first embodiment described previously, the stators 881 and 891 and the rotor magnet 84 are disposed such that the center line of the stators 881 and 891 is disposed farther toward an opposing surface 12A side of the main plate 11A than the center line of the rotor magnet 84.

First Bearing

In the present embodiment, the first bearing 100A includes a frame body 110A fixed to the main plate 11A, the hole jewel 120 fixed to the frame body 110A, the cap jewel 130 disposed in the frame body 110A, and the hold spring 140 that holds the cap jewel 130.

In addition, the frame body 110A is formed using a non-magnetic material such as a non-magnetic metal or synthetic resin. The frame body 110A includes a disk-shaped holding portion 111A, a ring-shaped positioning portion 112A that is continuous with the outer periphery of the holding portion 111A, and an extending portion 113A extending farther toward the dial 3 side than the cap jewel 130. Specifically, on the outer peripheral side of the holding portion 111A, the extending portion 113A extends on the dial 3 side in a ring shape. That is, on the outer peripheral side of the holding portion 111A, the extending portion 113A is disposed on the opposite side of the positioning portion 112A.

In addition, in the present embodiment, the main plate 11A includes a fixing portion 13A that fixes the extending portion 113A of the frame body 110A. This allows the main plate 11A to fix the frame body 110A at a position on the dial 3 side. Accordingly, the fixing portion 13A of the frame body 110A in the main plate 11A and the rotor magnet 84 can be disposed away from each other.

Further, in the present embodiment, an opening S is formed at a position on the rotor magnet 84 side of the fixing portion 13A in the main plate 11A. Specifically, an opening S having a diameter larger than that of an opening constituting the fixing portion 13A that fixes the frame body 110A is formed in the main plate 11A. This makes it possible to suppress the main plate 11A and the rotor magnet 84 from being disposed in proximity at a position on the rotor magnet 84 side of the fixing portion 13A. That is, as illustrated in FIG. 6, the shortest distance L2 between the rotor magnet 84 and the main plate 11A when the opening S is provided can be made greater than the shortest distance L1 between the rotor magnet 84 and the main plate 11A when the opening S is not provided. Accordingly, the main plate 11A and the rotor magnet 84 can be disposed farther away from each other.

Operations and Effects of Second Embodiment

According to the present embodiment, the following advantageous effects can be obtained.

In the present embodiment, in a cross-sectional view viewed from a direction perpendicular to the axial direction of the rotary shaft 82 of the rotor 81, the frame body 110A is fixed to the main plate 11A at a position farther toward the dial 3 side than the hole jewel 120 relative to the rotor magnet 84. This makes it possible to dispose the main plate 11A for fixing the frame body 110A farther toward the dial 3 side, and thus the main plate 11A formed to contain a magnetic material and the rotor magnet 84 can be disposed away from each other. Accordingly, leakage magnetic flux leaking from the rotor magnet 84 to the magnetic material portion of the main plate 11A can be decreased, and eddy current loss at the main plate 11A can be suppressed.

In the present embodiment, the main plate 11A fixes the extending portion 113A extending farther toward the dial 3 side than the cap jewel 130, and thus the fixing place of the frame body 110A by the main plate 11A can be disposed farther toward the dial 3 side. Accordingly, the rotor magnet 84 and the main plate 11A can be disposed away from each other. Further, compared to a case in which the extending portion 113A is not provided, the surfaces with which the frame body 110A and the main plate 11A abut on each other can be enlarged, and thus the frame body 110A can be reliably fixed by the main plate 11A.

In the present embodiment, the opening S is formed on the rotor magnet 84 side of the fixing portion 13A in the main plate 11A, and thus the main plate 11A and the rotor magnet 84 can be suppressed from being disposed in proximity at a position on the rotor magnet 84 side of the fixing portion 13A. Accordingly, the main plate 11A and the rotor magnet 84 can be disposed farther away from each other.

Modified Examples

Note that the present disclosure is not limited to the embodiments described previously. Any modifications, improvements, and the like are encompassed in the present disclosure as long as the object of the present disclosure can be achieved.

In each of the embodiments described above, the electronically controlled mechanical timepiece 1 includes two mainsprings: the first mainspring 20 and the second mainspring 30. However, the present disclosure is not limited thereto. For example, the electronically controlled mechanical timepiece 1 may include only one mainspring.

In the first embodiment described above, in a cross-sectional view, the center line P of the stators 881 and 891 is disposed farther toward the opposing surface 12 side than the first surface 841, which is the surface on the main plate 11 side of the rotor magnet 84. However, the present disclosure is not limited thereto. For example, in a cross-sectional view, a stator and a rotor magnet may be disposed such that the center line of the stator is disposed farther toward the train wheel bridge side than the surface on the main plate side of the rotor magnet. It is only required that a stator and a rotor magnet is disposed such that the center line of the stator is disposed farther toward the opposing surface side of the main plate than the center line of the rotor magnet.

In the second embodiment described above, the stators 881 and 891 and the rotor magnet 84 are disposed such that the center line of the stators 881 and 891 is disposed farther toward the opposing surface 12A side of the main plate 11A than the center line of the rotor magnet 84. However, the present disclosure is not limited thereto. For example, in a cross-sectional view, a stator and a rotor magnet may be disposed such that the center line of the stator and the center line of the rotor magnet coincide with each other. It is only required that the frame body 110 is fixed to the main plate at a position farther toward the dial side than the hole jewel relative to the rotor magnet.

Summary of Present Disclosure

An electronically controlled mechanical timepiece of the present disclosure includes: a rotor including a rotary shaft, a pinion that is provided on the rotary shaft and to which torque from a mainspring is transmitted, and a rotor magnet attached to the rotary shaft, the rotor being configured to rotate by the torque; a generator that includes a coil and a stator and that is configured to generate power by rotation of the rotor; a main plate that contains a magnetic material, that has an opposing surface opposed to the stator, and that is configured to support the rotary shaft of the rotor; wherein in a cross-sectional view viewed from a direction perpendicular to an axial direction of the rotary shaft, a center of the stator along the axial direction is disposed farther toward the opposing surface side than a center of the rotor magnet along the axial direction.

In the present disclosure, in a cross-sectional view viewed from a direction perpendicular to the axial direction of the rotary shaft of the rotor, the center of the stator along the axial direction is disposed farther toward the opposing surface side than the center of the rotor magnet along the axial direction. Thus, the main plate formed to contain a magnetic material and the rotor magnet can be disposed away from each other. Accordingly, leakage magnetic flux leaking from the rotor magnet to the magnetic material portion of the main plate can be decreased, and eddy current loss in the main plate can be suppressed.

In the electronically controlled mechanical timepiece of the present disclosure, in the cross-sectional view, the rotor magnet and the stator may be disposed at such positions as to at least partially overlap each other, and the center of the stator may be disposed farther toward the opposing surface side than the surface on the main plate side of the rotor magnet.

This makes it possible to dispose the rotor magnet away from the main plate while suppressing the effect on the magnetic flux density at the stator.

In the electronically controlled mechanical timepiece of the present disclosure, in the cross-sectional view, the rotor magnet and the stator may overlap each other by 35% or more of the dimension in the height direction of the rotor magnet.

In the electronically controlled mechanical timepiece of the present disclosure, in the cross-sectional view, the rotor magnet and the stator may overlap each other by 50% or more of the dimension in the height direction of the rotor magnet.

This makes it possible to dispose the rotor magnet away from the main plate with the magnetic flux density at the stator largely unaffected.

An electronically controlled mechanical timepiece of the present disclosure includes: a dial having a front surface and a back surface; a main plate that is disposed on a back surface side of the dial and that contains a magnetic material; a rotor including a rotary shaft having a tenon on both ends, a pinion that is provided on the rotary shaft and to which torque from a mainspring is transmitted, and a rotor magnet attached to the rotary shaft, the rotor being disposed on an opposite side of the main plate from the dial and being configured to rotate by the torque; a bearing including a frame body that is fixed to the main plate and that is formed using a nonmagnetic material, a hole jewel that is fixed to the frame body and into which one tenon of the rotary shaft is inserted, a cap jewel disposed inside the frame body, and a hold spring configured to hold the cap jewel, the bearing being configured to journal the other tenon; wherein in a cross-sectional view viewed from a direction perpendicular to an axial direction of the rotary shaft, the frame body is fixed to the main plate at a position farther toward a dial side than the hole jewel relative to the rotor magnet.

In the present disclosure, in a cross-sectional view viewed from a direction perpendicular to the axial direction of the rotary shaft of the rotor, the frame body is fixed to the main plate at a position farther toward the dial side than the hole jewel relative to the rotor magnet. This makes it possible to dispose the main plate for fixing the frame body farther toward the dial side, and thus the main plate formed to contain a magnetic material and the rotor magnet can be disposed away from each other. Accordingly, leakage magnetic flux leaking from the rotor magnet to the magnetic material portion of the main plate can be decreased, and eddy current loss in the main plate can be suppressed.

In the electronically controlled mechanical timepiece of the present disclosure, the frame body may include an extending portion extending farther toward the dial side than the cap jewel in the cross-sectional view, and the main plate may fix the extending portion. This causes the main plate to fix the extending portion extending farther toward the dial side than the cap jewel, and thus the fixing place of the frame body by the main plate can be disposed farther toward the dial side. Accordingly, the rotor magnet and the main plate can be disposed away from each other.

In the electronically controlled mechanical timepiece of the present disclosure, the main plate may include a fixing portion configured to fix the frame body, and an opening may be formed on the rotor magnet side of the fixing portion in the main plate.

This causes an opening to be formed on the rotor magnet side of the fixing portion in the main plate, and thus the main plate and the rotor magnet can be suppressed from being disposed in proximity at a position on the rotor magnet side of the fixing portion. Accordingly, the main plate and the rotor magnet can be disposed farther away from each other.

What is claimed is:

1. An electronically controlled mechanical timepiece comprising:
- a rotor including
  - a rotary shaft,
  - a pinion provided on the rotary shaft and to which torque from a mainspring is transmitted, and
  - a rotor magnet attached to the rotary shaft, the rotor being rotatable;
- a generator including a coil and a stator, the generator being configured to generate power by rotation of the rotor;
- a main plate containing a magnetic material, the main plate having an opposing surface opposed to the stator, and the main plate being configured to support the rotary shaft of the rotor; wherein
- in a cross-sectional view viewed from a direction perpendicular to an axial direction of the rotary shaft, a center of the stator along the axial direction is disposed farther toward the opposing surface side than a center of the rotor magnet along the axial direction.

2. The electronically controlled mechanical timepiece according to claim 1, wherein
- in the cross-sectional view, the rotor magnet and the stator are disposed at such positions as to at least partially overlap each other and
- the center of the stator is disposed farther toward the opposing surface side than a surface on the main plate side of the rotor magnet.

3. The electronically controlled mechanical timepiece according to claim 2, wherein
- in the cross-sectional view, the rotor magnet and the stator overlap each other by 35% or more of a dimension in a height direction of the rotor magnet.

4. The electronically controlled mechanical timepiece according to claim 3, wherein
- in the cross-sectional view, the rotor magnet and the stator overlap each other by 50% or more of the dimension in the height direction of the rotor magnet.

5. An electronically controlled mechanical timepiece comprising:
- a dial having a front surface and a back surface;
- a main plate disposed on the back surface side of the dial, the main plate containing a magnetic material;
- a rotor including
  - a rotary shaft having a tenon on both ends,
  - a pinion provided on the rotary shaft and to which torque from a mainspring is transmitted, and
  - a rotor magnet attached to the rotary shaft, the rotor being disposed on an opposite side of the main plate from the dial and being configured to rotate by the torque;
- a bearing including
  - a frame body fixed to the main plate, the frame body being formed of a nonmagnetic material,
  - a hole jewel fixed to the frame body and into which one tenon of the rotary shaft is inserted,
  - a cap jewel disposed inside the frame body, and
  - a hold spring configured to hold the cap jewel,
- the bearing being configured to rotatably support the one tenon; wherein
- in a cross-sectional view viewed from a direction perpendicular to an axial direction of the rotary shaft, the frame body is fixed to the main plate at a position farther toward the dial side than the hole jewel relative to the rotor magnet.

6. The electronically controlled mechanical timepiece according to claim 5, wherein
- the frame body includes an extending portion extending farther toward the dial side than the cap jewel in the cross-sectional view and
- the main plate fixes the extending portion.

7. The electronically controlled mechanical timepiece according to claim 5, wherein
- the main plate includes a fixing portion configured to fix the frame body and an opening is formed, on the rotor magnet side of the fixing portion, in the main plate.

* * * * *